United States Patent [19]

Lahti et al.

[11] 3,812,463

[45] May 21, 1974

[54] PROCESSOR INTERRUPT POINTER

[75] Inventors: Archie E. Lahti, Minneapolis, Minn.; Donald G. McBeath, Furlong, Pa.

[73] Assignee: Sperry Rand Corporation, New York, N.Y.

[22] Filed: July 17, 1972

[21] Appl. No.: 272,608

[52] U.S. Cl. .............................................. 340/172.5
[51] Int. Cl. .............................................. G06f 9/18
[58] Field of Search .................................. 340/172.5

[56] References Cited

UNITED STATES PATENTS

| | | | |
|---|---|---|---|
| 3,676,861 | 7/1972 | Ruth | 340/172.5 |
| 3,665,404 | 5/1972 | Werner | 340/172.5 |
| 3,200,380 | 8/1965 | MacDonald | 340/172.5 |
| 3,421,150 | 1/1969 | Quosig | 340/172.5 |
| 3,482,264 | 12/1969 | Cohen | 340/172.5 |
| 3,483,521 | 12/1969 | Frasier | 340/172.5 |
| 3,566,357 | 2/1971 | Ling | 340/172.5 |
| 3,593,302 | 7/1971 | Saito | 340/172.5 |
| 3,648,253 | 3/1972 | Mullery | 340/172.5 |

*Primary Examiner*—Raulfe B. Zache
*Attorney, Agent, or Firm*—Thomas J. Nikolai; Kenneth T. Grace; John P. Dority

[57] ABSTRACT

In a multiprocessor system employing at least one Input/Output Access Unit (IOAU) and two Command-/Arithmetic Units (CAU), a system for selectively routing exernal interrupt request signals through said IOAU to either of said two CAU's directly to said two CAU's alternately, or to the CAU which originated the activity resulting in the generation of the interrupt request signal.

2 Claims, 12 Drawing Figures

PROCESSOR INTERRUPT POINTER

BACKGROUND OF THE INVENTION

This invention relates generally to a means for routing interrupt request signals in a multiprocessor system which employs at least one input/output access command unit (IOAU) and at least two command/arithmetic units (CAU), and more specifically the invention relates to a means for routing an interrupt request signal from either IOAU to either CAU in accordance with any one of the four routing patterns.

In the prior art several different ways have been utilized to handle interrupt request signals in a multiprocessor system. In one such prior art system, employing at least two CAU's and at least one IOAU, all of the interrupts are routed to one of the two CAU's. Such an arrangement permits the remaining CAU to be dedicated to the running of programs without periodically being interrupted by interrupt signals with the resulting changing of programs and the attendant housekeeping required to maintain records of the changed programs.

On the other hand, in such a system, the CAU dedicated to accepting interrupts only might have substantial idle time while no interrupts are being received. If such dedicated CAU is also employed to run some programs, then the necessity for maintaining records of changed programs arises.

Another commonly used method of handling interrupts is to assign each interrupt to the CAU which originated the particular channel activity resulting in the interrupt. Thus, for example, if a given CAU in a two CAU system initiated activity in an I/O channel accessing a tapestand, then such given CAU necessarily would be required to handle the interrupt occurring when the tapestand was ready for use.

The last-mentioned arrangement has a disadvantage in that the originating CAU might be processing a high priority program at the time an interrupt signal occurs, in which case either the interrupt signal must wait or, alternatively, the high priority program must be interrupted.

It would mark a definite improvement in the art to provide a means whereby interrupts in a multiprocessor system can be routed either to the originating CAU, to either CAU selectively, or to alternate CAU's depending upon decisions made in the executive program. Thus, for example if the executive program had assigned a high priority user program to a given CAUA the executive program would then instruct the system that all interrupts were to be handled by CAUB. Upon the completion of the high priority program in CAUA the executive program could then change the instructions for handling interrupts in accordance with whatever new conditions might have arisen.

Such new conditions might be that each CAU is to handle those interrupts which it initiated. Alternatively it might be desired that successive interrupts are to be handled by the two CAU's alternately.

It is the primary object of the present invention to provide a means in a multiprocessor system whereby under the control of an executive program the routing of interrupts is selectable and can be routed either to the interrupt originating CAU, to the two CAU's alternately, or selectively to either of the two CAU's.

STATEMENT OF INVENTION

In accordance with the invention there is provided a processor interrupt pointer (PIP) register for successively receiving and storing a series of instructions supplied thereto under control of the executive program. Each of these instructions, while it is stored in the PIP register, determines the routing of the subsequently received interrupt request signal to the CAU's. As first control means is responsive to an instruction from the executive program for loading the PIP register with the routing instructions. A second control means is responsive to the specific routing instruction stored in said PIP register to implement the routing of the next received interrupt signal to the selected one of said two CAU's.

More specifically, the first control means is instructed to respond to an executive instruction to load said PIP register with one of four instructions which direct the routing of a received interrupt to the originating CAU, the alternate CAU, CAUA or CAUB, respectively. The second control means is responsive to the first of a particular one of the four instructions supplied to and stored in the PIP register to implement the routing of the received interrupt to the originating CAU, the alternate CAU, CAUA or CAUB, respectively.

To accommodate the situation where the interrupt is to be processed by the originating CAU there is provided a plurality of originating determining flip-flops, with one each of said originating determining flip-flops being associated with each input/output channel of each of the two CAU's. Each of said flip-flops is constructed to respond to the last interrupt request in such channel to indicate whether such last interrupt request was processed in CAUA or CAUB so that the next interrupt can be routed to the appropriate input/output channel of the originating CAU.

To accommodate those situations where successive interrupt signals are to be processed by the two CAU's alternately there is provided a toggle flip-flop. Such toggle flip-flop is responsive to said second control means to toggle upon the receipt of each received interrupt signal to indicate which CAU processed the last received interrupt request signal and thereby indicate which CAU is to process the next received interrupt signal.

To accommodate those situations where the next received interrupt signal is to be processed either by the CAUA or the CAUB in accordance with the setting of the PIP register, a gating means is provided in the second control means. Such gating means responds directly to the instruction contained in the PIP register to route the next received instruction either to the CAUB or the CAUA for processing.

To make certain that a given CAU has completed the processing of one interrupt before another interrupt is supplied thereto there is provided a pair of hardware interrupt disable (HID) flip-flops, one for CAUA and one for CAUB, which flip-flops function to indicate when the associated CAU is processing an interrupt. As long as the HID flip-flop is set the associated CAU will not accept another interrupt and any attempt to supply an interrupt to said CAU is aborted. A subsequent attempt to supply the interrupt must then be made. Upon completion of the processing of an interrupt a given CAU will clear the associated HID flip-flop, thereby indicating to the IOAU that it is ready to accept another interrupt. Accordingly, when the next interrupt is supplied to such CAU it will be received by the CAU for processing.

Another pair of flip-flops, one for each CAU and identified herein as interrupt request flip-flops, are provided to request that a given CAU process an interrupt. Such flip-flops are set when a request is made to the associated CAU to process an interrupt. Such request can be made however, only when the associated CAU is free to accept the request, i.e., is not processing another interrupt request or is not performing some other function which takes priority over a received interrupt request signal.

BRIEF DESCRIPTION OF THE DRAWINGS

The above-mentioned and other objects and features of the invention will be more fully understood from the following detailed description thereof when read in conjunction with the drawings in which.

DESCRIPTION OF THE PREFERRED EMBODIMENT

The following description is organized in the following manner.

Figure 1:
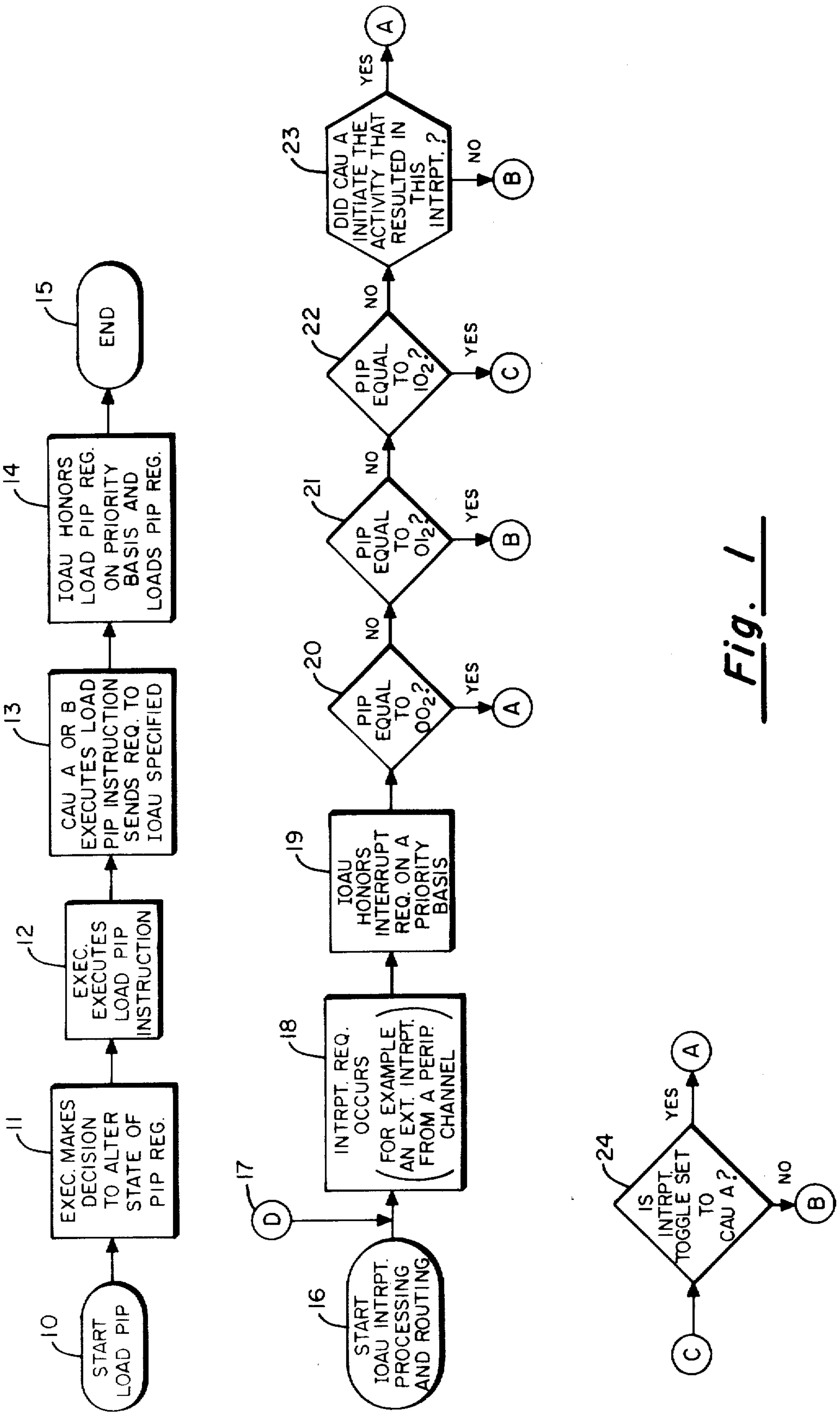
FIGS. 1 and 1A are logic flow charts showing the logical steps that the system goes through in performing its functions.
Figure 1A:
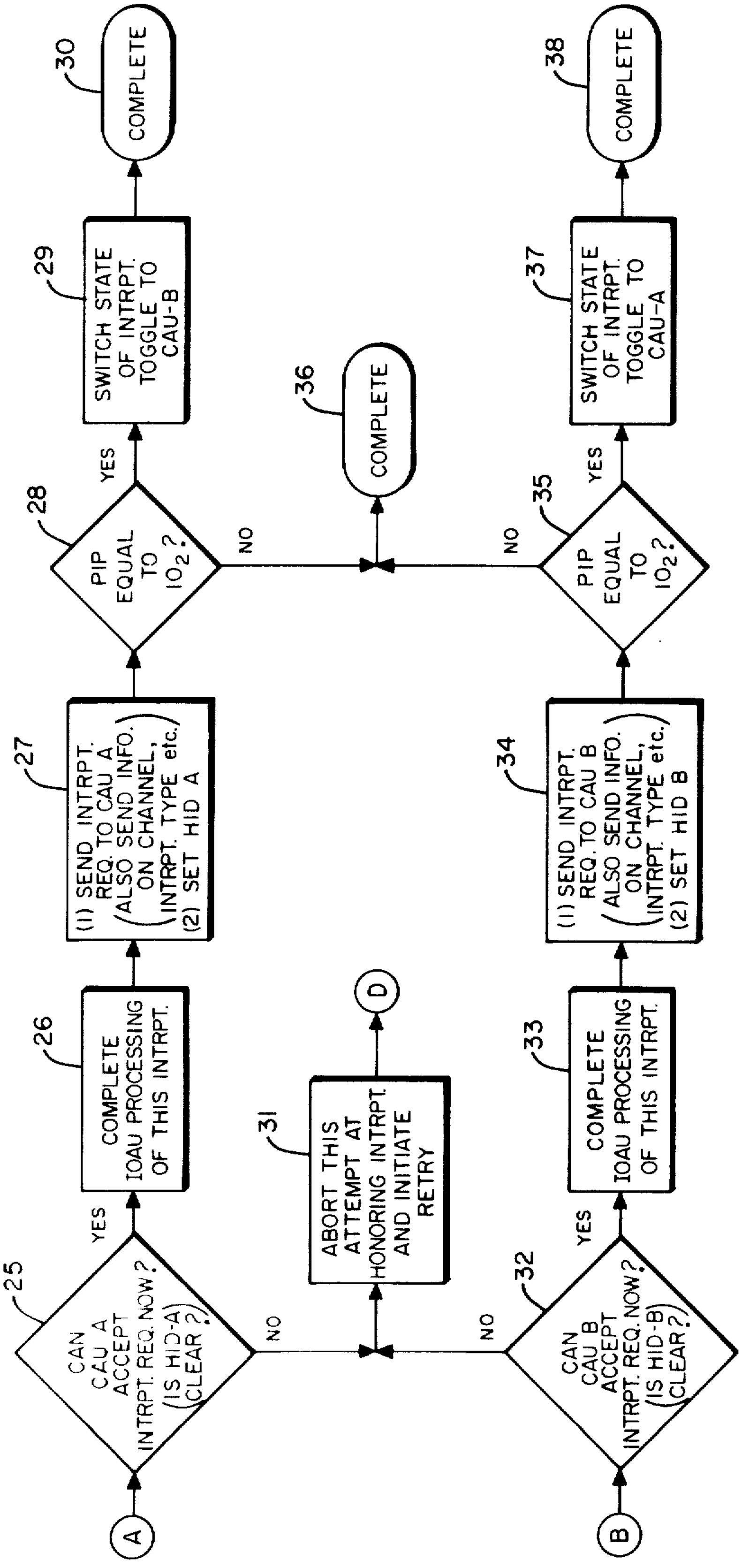
Figure 2:
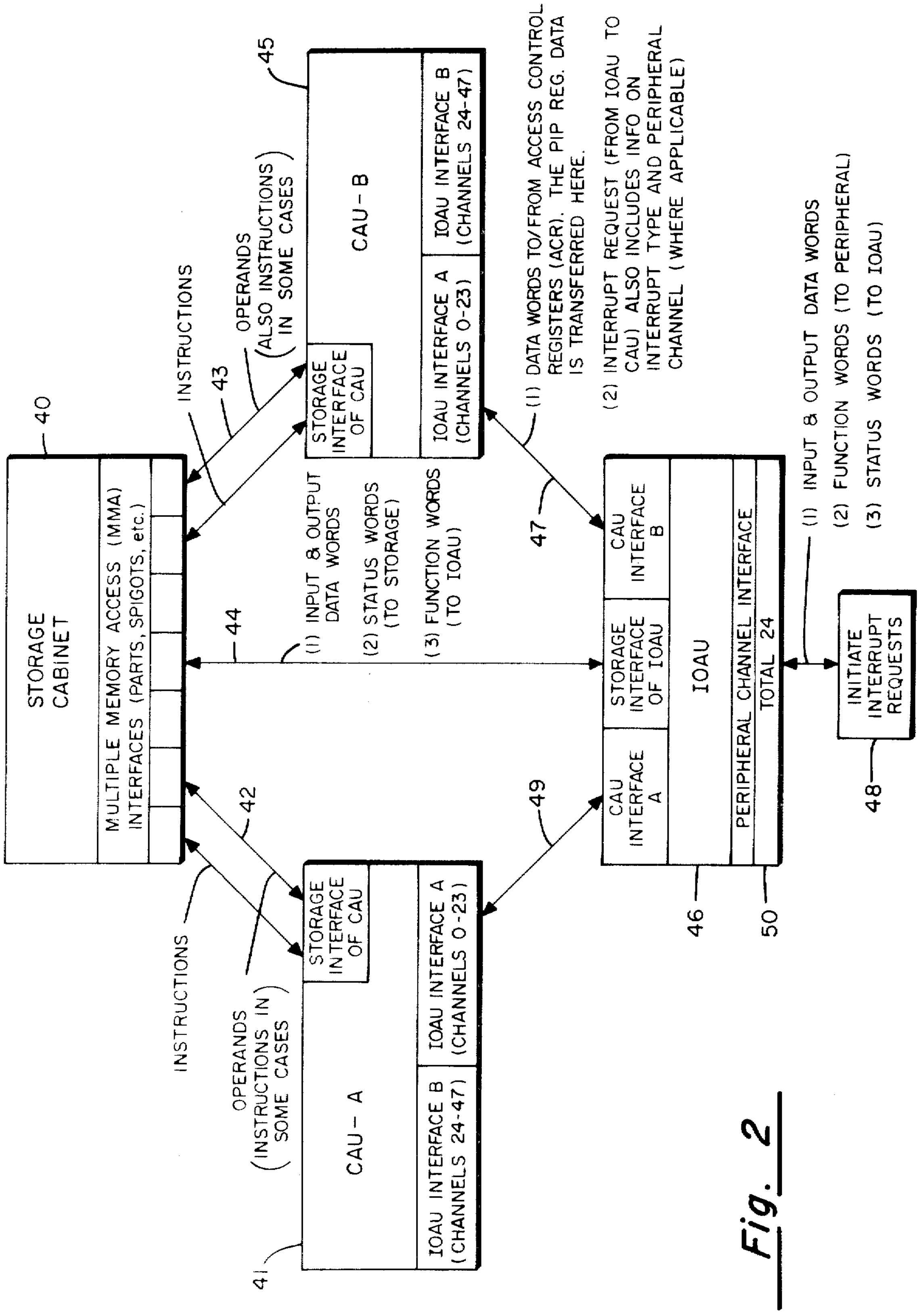
FIGS. 2 is a broad block diagram showing the relationship between the IOAU, CAUA, CAUB and the main memory, and in general shows the broad functional relations for making a request for a particular instruction to be supplied to the PIP register and for processing interrupt request signals in the system.

I. GENERAL FUNCTIONAL DESCRIPTION (FIGS. 1, 1A and 2)

II. GENERAL DESCRIPTION OF SYSTEM (FIGS. 2, 3 AND 3A) A. OPERATION OF FIGS. 3 AND 3A

III. DESCRIPTION OF LOGIC FOR IMPLEMENTING PIP REGISTER (FIGS. 4 AND 4A)

Figures 5, 5B:
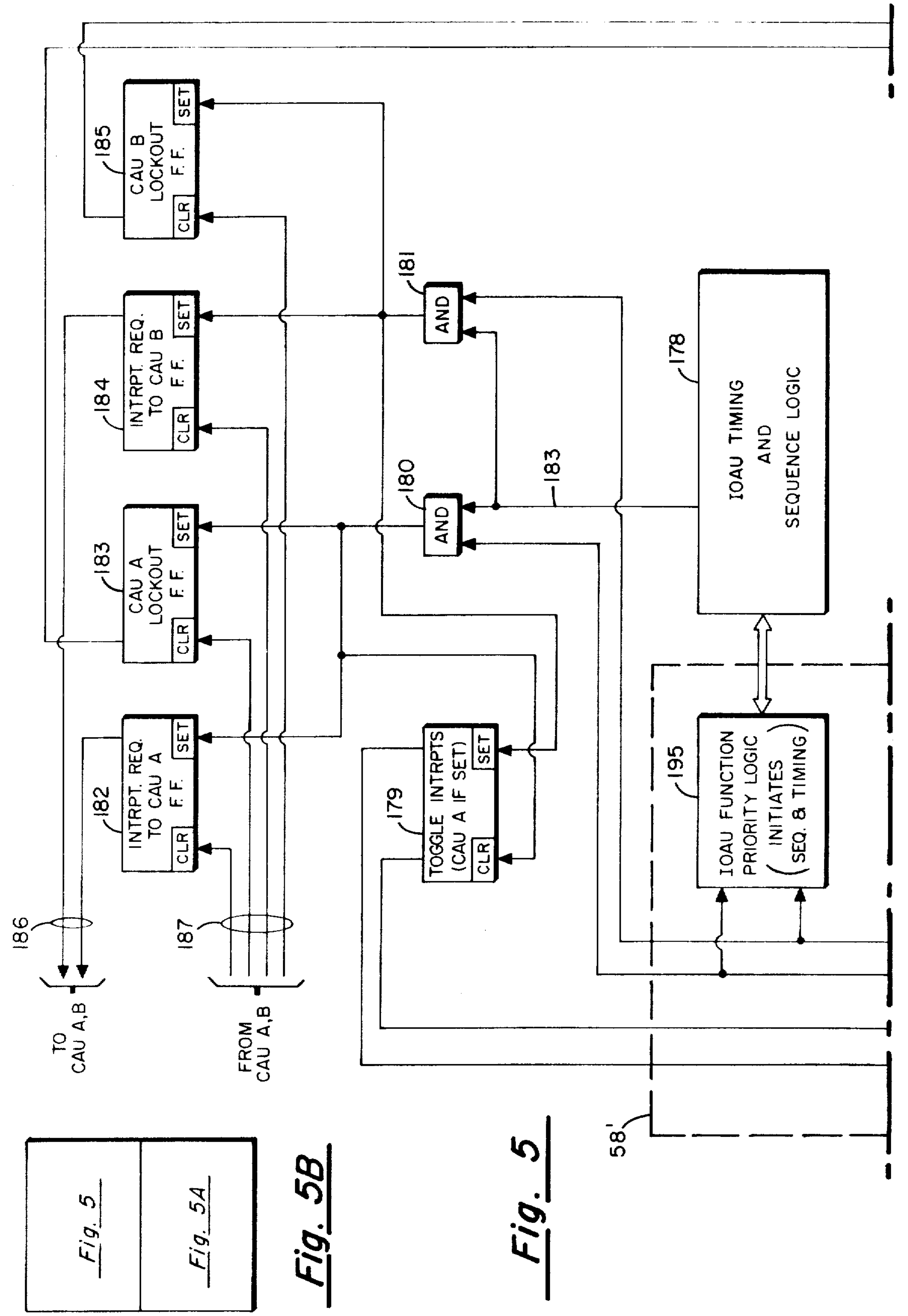
FIGS. 5 and 5A, when oriented as indicated in FIG. 5B, illustrates a detailed block diagram of the structure required to implement the routing of a received interrupt request signal in accordance with the instruction stored in the PIP register by the logic shown in FIGS. 4 and 4A.
Figure 5A:
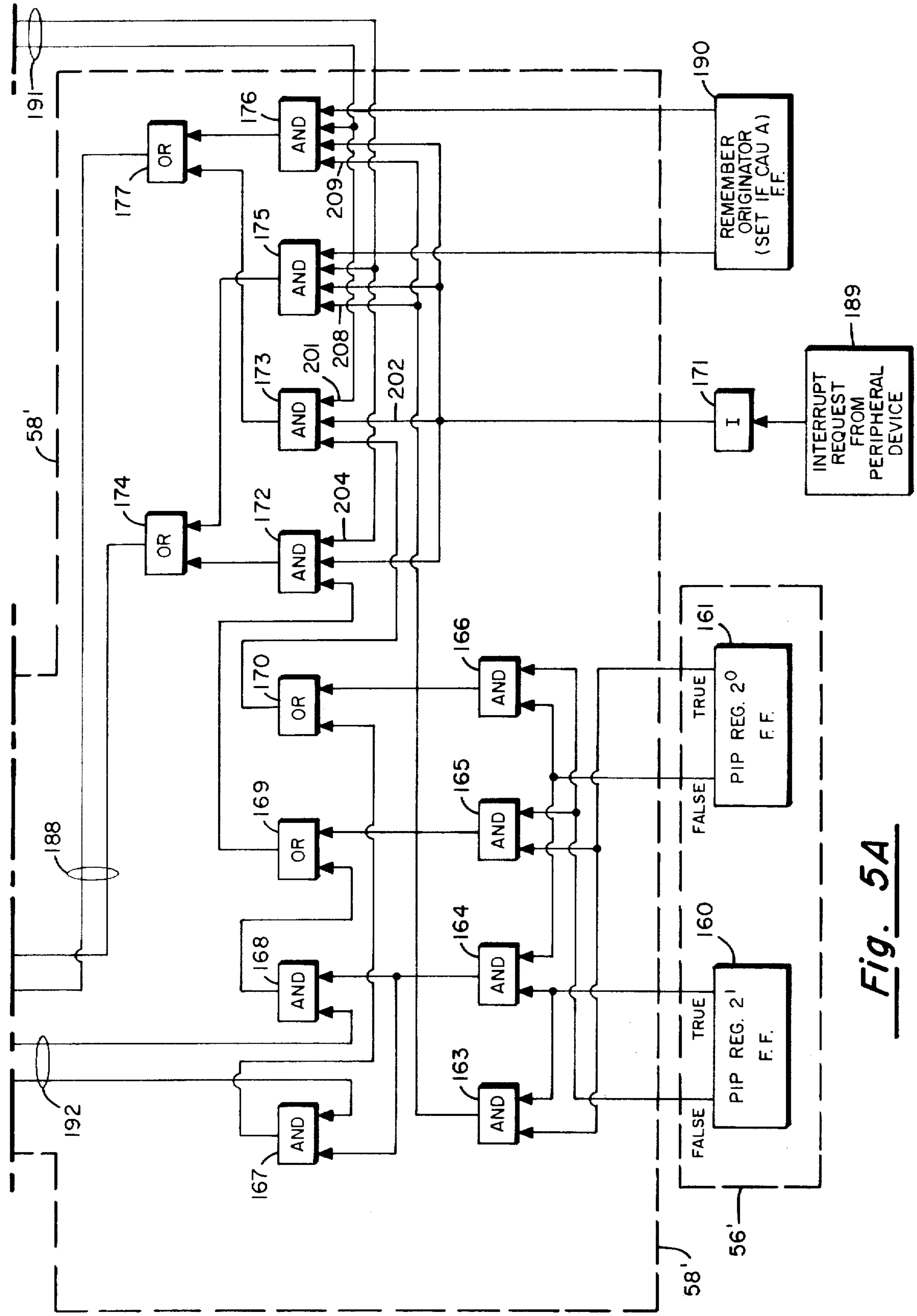

IV. DESCRIPTION OF LOGIC FOR IMPLEMENTING ROUTING OF INTERRUPT SIGNALS IN ACCORDANCE WITH THE INSTRUCTION IN PIP REGISTER (FIGS. 5 AND 5A)

The following abbreviations will be used in the spec fication.

PIP register

Processor Interrupt Pointer register. The processor interrupt pointer register is adopted to hold the instruction which controls the routing of the interrupt signals.

HID flip-flops

Hardware Interrupt Disable flip-flops. The hardware interrupt disable flip-flops function to disable the routing of an interrupt signal to a given CAU when said CAU is busy. HID A flip-flop is associated with CAUA and HID B flip-flop is associated with CAUB.

CAU

Command Arithmetic Unit. The command arithmetic unit is a major component of the multiprocessor system and functions generally to execute all the arithmetic operations in the system.

IOAU

Input/Output Access Unit. The input/output access unit is a major component of a multiprocessor system and functions generally to control the input/output functions of the system.

I. GENERAL FUNCTIONAL DESCRIPTION (FIGS. 1, 1A AND 2)

Referring now to FIGS. 1 and 1A there is shown a flow chart of the logic of the invention. In FIG. 1 the blocks 10, 11, 12, 13, 14 and 15 represent the steps required to load the PIP register following a decision by the executive program to alter the state of the PIP register.

The remaining portion of the flow diagram shown in FIGS. 1 and 1A, including the blocks 16 – 38, represent the steps required to route a received interrupt request signal to either of the two CAU's in the system in accordance with the instruction contained in the PIP register.

Referring again to blocks 10 – 15, the execution of the executive program governing the operation of the multiprocessor system initially causes a decision to be made which alters the state of the PIP register, as indicated in block 11. The PIP register can be loaded with four different routing instructions to create four different routing patterns for the received interrupt signals. These four different routing instructions in binary numbers and their meanings are as follows.

1. $00_2$—The interrupt signals are to be routed to cAUA.
2. $01_2$—The interrupt signals are to be routed to CAUB.
3. $10_2$—The interrupt signals are to be toggled between CAUA and CAUB.
4. $11_2$—The interrupt signals are to be routed to the CAU that originated the channel activity resulting in the generation of the interrupt signals.

Having decided on the particular routing pattern to be employed, the system then executes an instruction termed (load PIP register), as indicated in block 12.

Subsequently, as shown in block 13, either CAUA or CAUB executes the load PIP instruction by accessing memory and reading the PIP instruction therefrom. The CAUA or CAUB then sends a request to the IOAU indicating that it has the PIP instruction from memory and is ready to supply it to the PIP register.

Next, as shown in block 14, the IOAU honors the load PIP request from the CAU, on a priority basis, and loads the PIP register with the instruction obtained from memory by the CAU.

At this point in the operation, the PIP register has become loaded with one of the four two-bit instructions set forth above and will function to route the next received interrupt signals in accordance with said two-bit instruction.

Block 18 represents the fact than an interrupt signal has occurred, as for example, from a peripheral device on one of the IOAU input/output channels, and that the IOAU has recognized and commenced honoring said interrupt signal. The completion of the honoring of the interrupt request by the IOAU is represented by block 19. It is to be noted that block 19 honors an interrupt request on a priority basis. More specifically, there might be several interrupts pending, of which only one is selected to be acted upon, based on a predetermined priority rating. The completion of the honoring of the interrupt request implies that loading of the PIP register has also been completed, as discussed above in connection with blocks 10 – 15.

In order for the IOAU to direct the selected interrupt to the proper CAU it is necessary to examine the contents of the PIP register, which examination is done as shown in blocks 20, 21, 22 and 23. More specifically, block 20 determines if the PIP register contains a $00_2$; the block 21 determines if the PIP register contains a $01_2$; and the block 22 determines if the PIP register contains a $10_2$. Should the decision in each of the blocks 20, 21, and 22 be a NO then the PIP register must necessarily contain a $11_2$. The block 23 then determines which CAU initiated the activity that resulted in the particular interrupt being processed.

The flow chart symbols 24 – 38 indicate the response to each of the above-mentioned four possible conditions of the PIP register such that the interrupt signal being processed is routed in one of four different routing patterns. For purposes of discussion assume that the PIP register was loaded with a $00_2$. Under such conditions the decision block 20 will produce a YES output on line A, which line is connected to the input of decision block 25 in FIG. 2.

As set forth above a PIP instruction of $00_2$ dictates that the interrupt signal is to be routed to CAUA. The decision block 25 then determines if CAUA is in a condition to accept the interrupt request at this time. Whether CAUA can accept the current interrupt request is determined by the condition of the HID A flip-flop which, as discussed above, is set or cleared to indicate that CAUA is busy or is not busy and can or cannot accept the interrupt request currently being processed. If the HID flip-flop is set and the answer is NO, then the attempt to route the interrupt to CAUA is aborted, as indicated by block 31, and a retry of the routing of the interrupt is initiated.

In accordance with the initiation of the retry, the output D of block 31 is shown as being connected to the input of block 18 and the interrupt is made again to the IOAU. The steps represented by blocks 18, 19 and 20 are repeated and the YES output from decision block 20 is supplied to the input of decision block 25 in the manner already described.

Assume that on the second attempt the YES condition of decision block 25 is satisfied so that the operation represented by block 26 is effected to complete the processing of the interrupt by the IOAU. The completion of such IOAU processing includes, for example, in the case of an external interrupt signal of the peripheral channel, the storing of a status word in storage and the acknowledging to the peripheral I/O channel of the receipt of the interrupt signal from such peripheral I/O channel.

The next step in the operation, as indicated in block 27, is to send the interrupt request signal to CAUA, along with additional information the CAUA will need to process the interrupt signals. Such additional information includes, for example, the identification of the input/output channel involved and the type of interrupt request signal received.

Under certain conditions to be discussed later, if the PIP register contains a $10_2$ the steps represented blocks 25, 26 and 27 will be utilized in determining the routing of the interrupt signal. Accordingly, a decision block 28 is needed to determine whether the contents of the PIP register is a $10_2$ or a $00_2$. If in fact the contents of the PIP register is a $00_2$ the output of decision block 28 will be a NO and the operation is completed as indicated by block 36. The interrupt signal will have been referred to the CAU which initiated the channel activity. In the foregoing example such CAU was the cAUA.

In the event that the PIP register holds a $01_2$ the decision block 21 will indicate a YES decision on the line connected to junction B of block 21. The next step in the sequence under the assumed conditions is represented by decision block 32 which determines if CAUB is in a condition to accept the interrupt request.

If CAUB is not in condition to accept the interrupt request then the attempt at honoring the interrupt is aborted (block 31). Also, a retry of such attempt to honor the interrupt is initiated. The retry is accomplished in much the same manner as discussed in connection with the case where the PIP register contains a $00_2$. More specifically, the output line D of flow diagram block 31 is connected to the input of block 18 (FIG. 1) and the retry attempt then occurs as represented by blocks 18, 19, 20 and 21. The decision block 21 will again indicate a YES output and the test depicted by block 32 will be accomplished. If CAUB is at this time in condition to accept the interrupt request, i.e., the HID B flip-flop is cleared, then the operation represented by symbols 33, 34, 35 are performed and the sequence is completed (block 36) in much the same manner as was described above in connection with blocks 25, 26, 27 and 28 and 36 when the PIP register contained a 00.

It is to be noted that the steps represented by blocks 32, 33, 34 and 35 might be utilized if the PIP contained a $10_2$. More specifically, if the test represented by decision block 22 provides a YES condition and if the decision block 24 subsequently provides a NO result then the steps represented by blocks 32, 33, 34 and 35 of FIG. 1A will be carried out.

As indicated above, the logic is designed to alternate the supplying of interrupt request signals between CAUA and CAUB when the PIP register contains a $10_2$. Under such conditions then the step represented either by the decision block 28 or the decision block 35, whichever one is applicable, will provide a YES result which will cause a toggle switch to toggle in the computing system incorporating the invention.

In those cases where the interrupt request signal is supplied to CAUB, and the steps represented by blocks 25, 26, 27 and 28 are accordingly employed, a toggle switch will toggle so that the next interrupt will be routed to CAUB (symbol 29 of FIG. 1A). The foregoing can be seen by examining decision block 24 in FIG. 1, which represents the interrogation of the toggle switch to determine if it is in its "set" or "clear" condition to route the next interrupt signal to CAUB. If the toggle switch is in fact set to route the next interrupt signal to CAUB by virtue of operation of the logic block 29, then the decision block 24, will, upon processing of the next interrupt request signal, produce a NO results. Such a NO results will cause the sequence of steps represented by blocks 32, 33, 34 and 35 to be carried out. As discussed above, this sequence functions to route the next interrupt signal to CAUB.

After the processing of said next interrupt request signal has been completed the state of the toggle switch will be reversed to route the next occurring interrupt request signal to cAUA (block 37).

In those cases where the PIP register contains a $11_2$ the system is designed to route the interrupt signal to the CAU that originated the channel activity. The decision block 23 in FIG. 1 is implemented in the computing system essentially by a flip-flop which remembers which CAU originated the said channel activity. If such CAU were in fact CAUA then the sequence to be followed includes the steps represented by blocks 25, 26, 27, 28 and 36. On the other hand if CAUB initiated the activity, the sequence followed includes the steps represented by blocks 32, 33, 34, 35 and 36.

Referring now to FIG. 2, there is shown a broad general block diagram of a multiprocessor system utilizing a single IOAU 46, a first CAUA 41, a second CAUB 45, and a main memory system 40.

In the operation of the present invention, an instruction in the executive program stored in memory 40 is supplied to one of the CAU's, such as CAUA 41. The CAUA 41 then functions to execute the "Load PIP Register" instruction by sending the request to the IOAU 46. In response to the request from the CAUA 41 the IOAU loads the PIP register which can be physcially located within the IOAU.

Subsequently, when an interrupt request occurs from some device, such as the peripheral device 48 in FIG. 2, the IOAU 46 responds thereto and will honor such interrupt request on a priority basis.

Assuming that the request is honored by the IOAU, the CAU to which the interrupt request signal is to be routed, according to the contents of the PIP register, is cleared as to its availability. If said CAU can accept the interrupt request signal at that time, the IOAU 46 completes the processing of the interrupt request by compiling necessary data information, such as the I/O channel involved and the storing of the status word in main memory 40. The IOAU 46 then sends the interrupt request signal to CAUA 41 along with the necessary identification information such as the input/output channel involved and the type of interrupt request signal.

The CAUA 41 will then access and process the new program called for by the interrupt request signal.

II. GENERAL DESCRIPTION OF LOGIC OF THE SYSTEM (FIGS. 2, 3, AND 3A)

Figure 3:
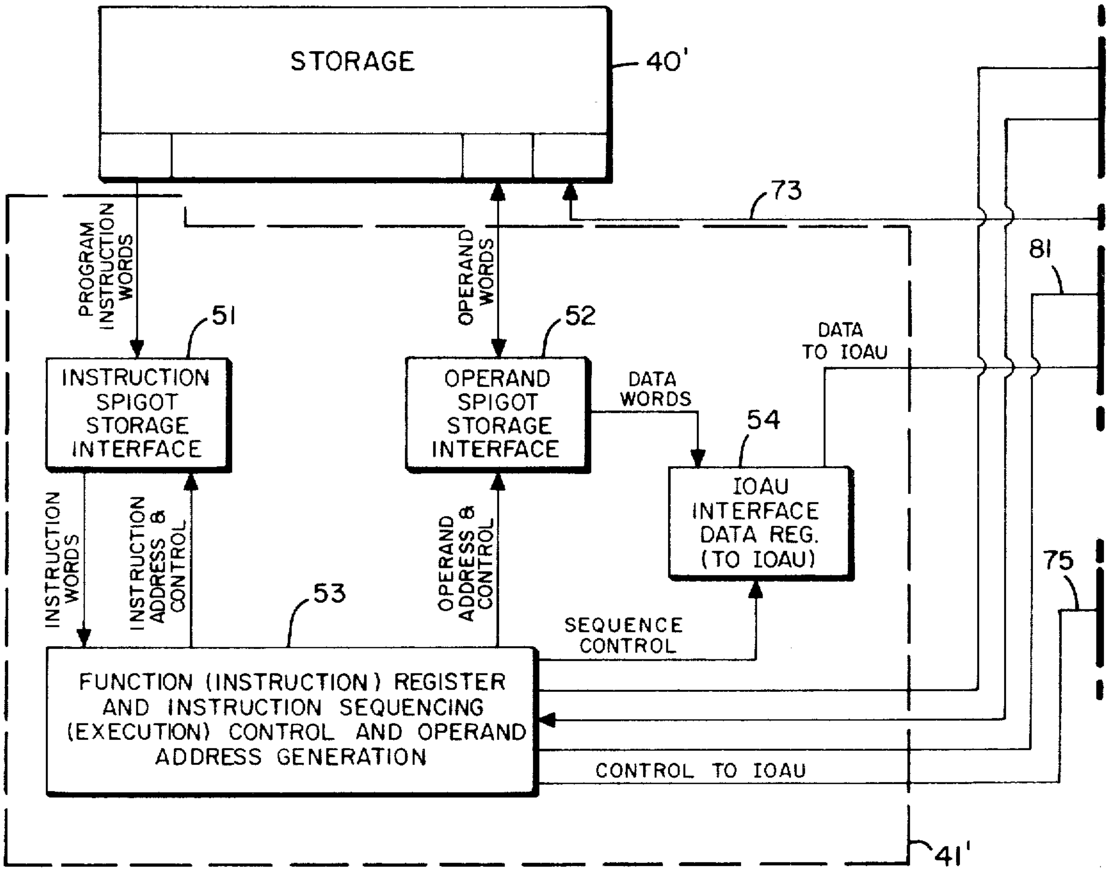
FIGS. 3 and 3A, when oriented as indicated in FIG. 3B, illustrates a more detailed block diagram of the entire system of the invention shown generally in FIG. 2.
Figure 3B:
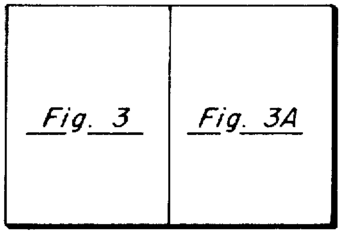
Figure 3A:
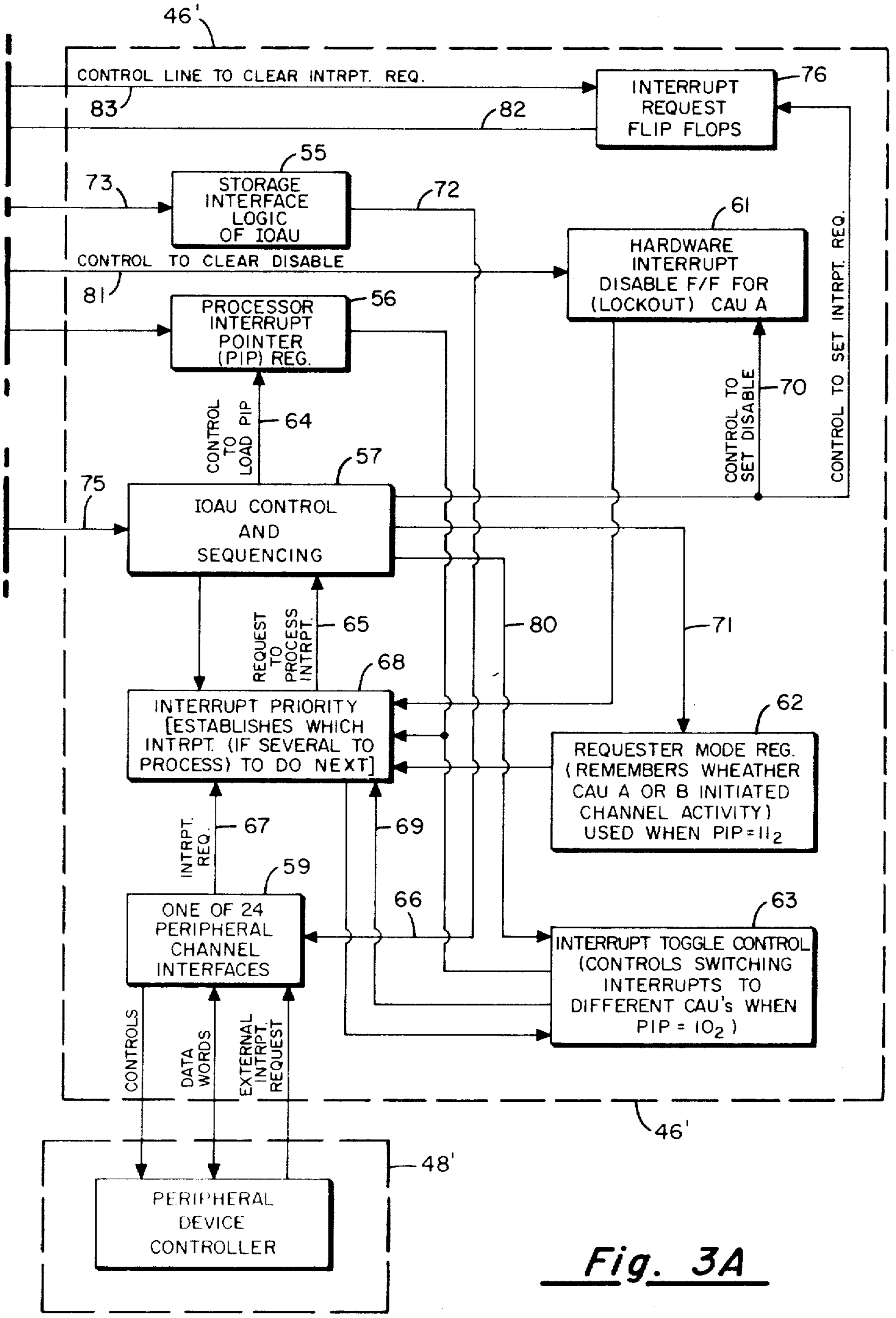

Referring now to FIGS. 3 and 3A there is shown in more detail the system illustrated generally by the block diagram of FIG. 2.

In FIGS. 3 and 3A the following correspondence with the structure of FIG. 2 can be made.

| FIGS. 3 and 3A | FIG. 2 |
|---|---|
| Block **41'** | CAUA **41** |
| Block **40'** | Main storage **40** |
| Peripheral device **48'** | Peripheral device **48** |
| IOAU **46'** | IOAU **46** |

It is to be noted that FIG. 3 contains detailed logic of the CAUA 41 only. No detailed logic of the second CAUB is shown in FIGS. 3 and 3A for reasons of simplicity of presentation. It is to be understood, however, that in the actual system there are in fact at least two CAU's involved, which CAU's are connected to the IOAU 46' of FIGS. 3 and 3A in the same general configuration as is shown in FIG. 2.

In FIGS. 3 and 3A the worker program instructions, as well as the instructions comprising the executive program, are supplied from the main storage means 40' through an instruction spigot storage interface 51 to block 53. The block 53 includes a function register and the instruction sequencing control means as well as the operand address generation means. Since such structures are themselves well known, it is considered unnecessary to describe a circuit implementation of same. The specific executive instruction calling for a change in state of PIP register 56 of FIG. 3A is also supplied from storage means 40' to the instruction register 53 through spigot 51.

An operand spigot storage interface 52 is under control of the block 53 to access operand words from main memory 40'. Such operand words are supplied from main memory 40' through spigot 52 in a conventional manner and into the IOAU interface data register 54, which is under control of the sequence controlling means contained within block 53.

Under control of such sequence controlling means within block 53 and the IOAU control and sequencing means 57 (FIG. 3A) the IOAU interface 54 supplies new data (the PIP instructions) into PIP register 56. The IOAU control and sequencing means 57 is controlled primarily by the control section 53 of the CAU via leads 75.

Under control of the IOAU control and sequencing block 57 the interrupt priority logic of block 68 functions to establish which interrupt of several received interrupt signals is to be processed first. While a specific priority control network is not illustrated, if further information on how such a network can be implemented is desired, reference is made to the Ehrman et al. Pat. No. 3,243,781.

Interrupt signals may be received from various sources, as for example a peripheral device 48', which supplies an "external interrupt request" via a lead to a peripheral interface 59 and then to the interrupt priority logic 68.

It is to be noted that other leads exist between peripheral device 48' and the peripheral channel interface 59, such as for example control leads and data transmission leads.

The interrupt toggle control 63 in its simplest form may comprise a flip-flop circuit responsive to the IOAU control and sequencing block 57 which connects to flip-flop 63 via lead 80, and the interrupt priority block 68 to produce an output on lead 69 which connects back to the interrupt priority circuit 68 causing successively received interrupt requests to be alternately routed to CAUA and CAUB.

The requester mode logic 62, which may also be simply a flip-flop network, is responsive to the IOAU control sequencing logic 57 via lead 71 and serves to remember whether CAUA or CAUB initiated the channel activity which resulted in the interrupt request signal being processed. There is one such flip-flop 62 for each input/output channel so that, in effect, there is a record of which CAU initiated the activity on any given input/output channel which resulted in the interrupt request signal currently being processed. The output from network 62 is supplied to the interrupt priority circuit 68 and, in cooperation with the instruction stored in PIP register 56, functions to route the received interrupt request signal to the proper CAU.

The hardware interrupt disable flip-flop (HIDA) 61 is set by an interrupt request to the CAUA shown in block 41' and thereby serves to lock out all future interrupt requests which would ordinarily be routed to CAUA until the processing of the current interrupt request is completed. It is to be noted that there is a HID flip-flop, such as flip-flop 61, for each of the CAU's utilized in a typical multiprocessor system.

Upon completion of the processing of the current interrupt request signal in CAU 41' in FIG. 3, a clear signal is supplied to HID flip-flop 61 via lead 81 from logic 53 in CAU 41', thereby informing the IOAU that CAUA 41' can receive another interrupt request signal.

There is also an interrupt request flip-flop such as flip-flop 76, for each of the CAU's employed in the system. Flip-flop 76 operates in cooperation with the CAU 41' shown in FIG. 3. The function of the interrupt request flip-flop 76 is to respond to the reception of an interrupt request for CAUA 41' to supply to CAUA 41' with a command that such interrupt request be processed. However, the HIDA flip-flop 61 must be cleared before the interrupt request signal can be received and before the interrupt request flip-flop can be energized.

OPERATION OF FIGS. 3 AND 3A

In this example it will be assumed that the PIP register is loaded with a $OO_2$ instruction which calls for an interrupt signal to be routed to CAUA 41' in FIG. 3.

To load the PIP register, the CAU 41' receives the executive instruction word from memory 40'. More specifically, the executive instruction is supplied through instruction spigot 51 to function block 53 where it is decoded. Upon decoding of the instruction, the operand address for the 2-bit word to be loaded into the PIP register is formed in block 52 and storage 40' is accessed for such operand address. The data contained in said operand address is the $00_2$ instruction. Such data word is transferred from storage 40' through block 52 and then into interface register 54. Also at this time the control signal on lead 75 is supplied to the IOAU control and sequencing block 57 of FIG. 3A, indicating that the PIP register 56 is to be activated for loading, The IOAU control network then generates the command for gating the 2 bit instruction word into the PIP register 56 on line 64.

Assume now that PIP register 56 is loaded with the instruction $00_2$. Assume further that subsequent to such loading an interrupt request signal from peripheral device 48' is supplied via one of the I/O channels 59 and into the interrupt priority network 68 through leads 67.

Assuming that the received interrupt request is selected from processing, the control line 65 from block 68 is activated to initiate the interrupt processing sequence which would correspond to the step represented by block 18 of FIG. 1.

The contents of PIP register 56 are now examined to determine which instruction is contained in the PIP register 56. As indicated in decision block 20 of FIG. 1, it is determined that the PIP register contains a $00_2$, thus establishing that the interrupt is to be routed to the CAUA 41' (assuming that CAUA 41' is prepared to receive interrupt signals). To determine whether CAUA 41' can accept the interrupt signal the logic examines the state of the HIDA flip-flop 61 in FIG. 3A. If the HIDA flip-flop 61 is in a set condition, the logic within block 68 will detect this condition and will abort this attempt at honoring the interrupt and a subsequent retry must be made, as discussed in connection with the flow diagram of FIG. 1.

Assume however, that HIDA flip-flop 61 is clear, indicating that the CAUA 41' can accept the received interrupt signals. Accordingly, signals will be sent to the interrupt request flip-flop 76 and to HIDA flip-flop 61 of FIG. 3A to set said flip-flops. Setting of the interrupt request flip-flop 76 functions to send a signal to the CAUA 41' via lead 82 which causes said CAUA 41' to terminate execution of the program currently being processed therein and to commence executing the instructions at stored in memory the location defined by the interrupt signal.

The setting of the HIDA flip-flop 61 indicates to the system that CAUA 41' is processing an interrupt signal and can receive no additional interrupt signals until such time as the HIDA flip-flop is again cleared.

At the termination of the processing of the interrupt routine stored in the memory of CAUA 41', it will supply a signal back to interrupt request flip-flop 76 via lead 83 which will clear flip-flop 76. Also, a signal will be sent back from the CAUA 41' to clear HIDA flip-flop 61 via line 81.

It is to be noted that under certain circumstances it is desirable to maintain CAUA 41' inaccessible to future interrupt request signals even though it has completed processing of an interrupt request signal. Under such conditions, the HIDA flip-flop 61 is allowed to remain in a set condition by reason of CAUA 41' not sending a clear signal to HIDA flip-flop 61 at the termination of the processing of an interrupt routine. The said flip-flop 61 can remain in such set condition until some later time when CAUA 41' becomes available for additional interrupt signal processing.

III. DESCRIPTION OF LOGIC FOR IMPLEMENTING LOADING OF PIP REGISTER (FIGS. 4 AND 4A)

Figure 4:
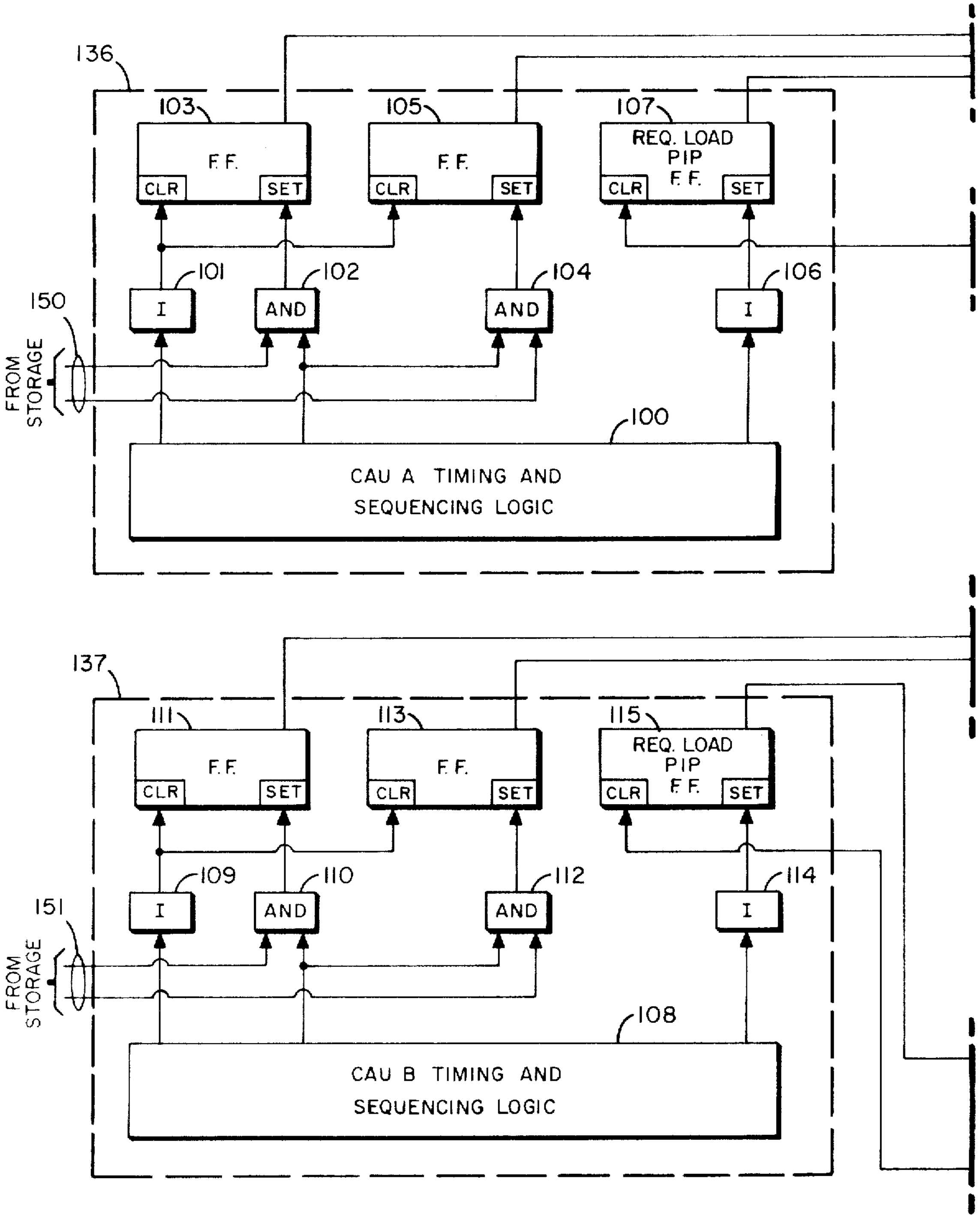
FIGS. 4 and 4A, when oriented as indicated in FIG. 4B, illustrates a block diagram of the logic required to load the PIP register, and more specifically show the logic required to implement the logical steps for loading the PIP register as set forth in FIG. 1.
Figure 4B:
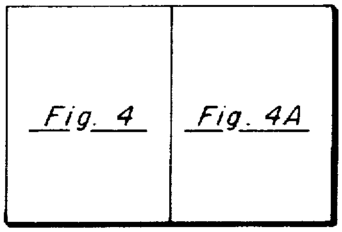

FIG. 4 shows a more detailed logic diagram of a portion of the diagram of FIGS. 3 and 3A, and more specifically shows a more detailed diagram of that portion of the logic required to carry out the steps represented by blocks 10 – 15 of FIG. 1 which function to load the PIP register.

Figure 4A:
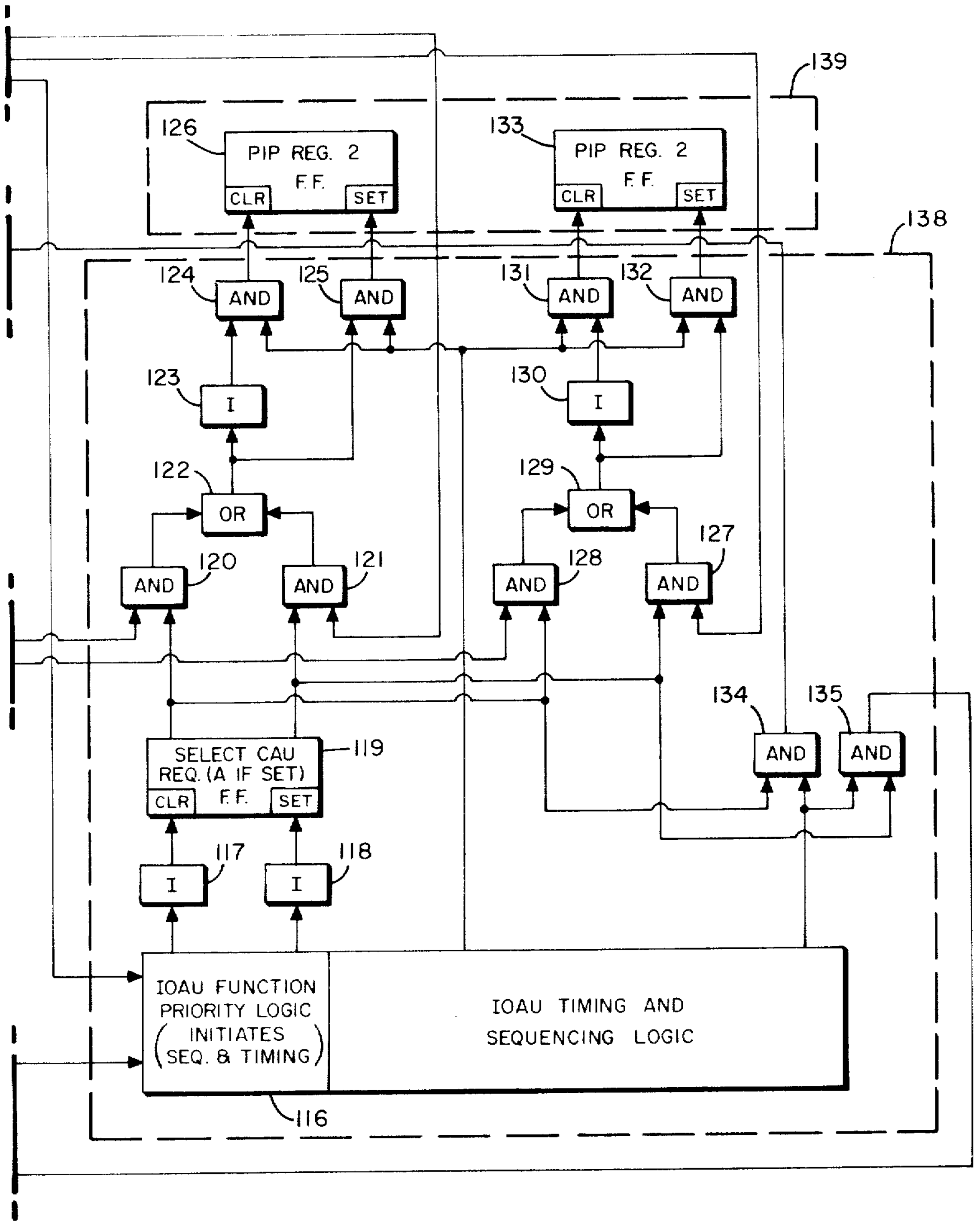

In general, the logic of FIGS. 4 and 4A is organized as follows. The logic within the dotted block 136 represents a portion of CAUA. The logic within the dotted block 137 represents a portion of the CAUB. The logic within the dotted block 138 represents the IOAU control and sequencing logic, and the logic within the block 139 represents the two stage PIP register.

The correspondence between the logic of FIGS. 4 and 4A and the logic of FIGS. 3 and 3A is set forth below.

| FIGS. 4 and 4A | FIGS. 3 and 3A |
|---|---|
| Block **100** | Blocks **51, 52** and **53** |
| Blocks **101, 102, 104, 106** | Logic block **53** |
| Logic blocks **103** and **105** | Logic block **54** |
| All of the logic within block **138** | Logic block **57** |

| Logic blocks 139 | Logic block 56 |
|---|---|

The logic within the dashed line block 137, as mentioned above, represents a portion of CAUB. However, since for convenience, no portion of CAUB is shown in FIGS. 3 and 3A, correspondence to FIGS. 4 and 4a cannot be presented. However, it is to be understood that the logic within the block 137 is a substantial duplicate of that within the block 136 except that it represents a different CAU.

Examining the logic within the block 136 in more detail, the block 100 contains the instruction register of CAUA, the instruction sequencing control, and the operand address generation circuitry. The block 100 also contains both the instruction spigot storage interface leading from the main storage and the operand spigot storage interface, which is also coupled to the main memory.

The data word from main memory is supplied from main memory (not shown in FIG. 4) via leads 150 to AND gates 102 and 104, which, in cooperation with the timing network in logic block 100, function to set or clear the flip-flops 103 or 105, depending upon whether there is a binary 1 or a 0 supplied from main memory on the leads 150.

The conditions of the two flip-flops 103 and 105 are utilized in the IOAU control and sequencing logic 138, in a manner to be described below, in order to enter the proper two-bit code into the PIP register which is comprised of flip-flops 126 and 133.

The flip-flop 107 is set at the same time the data word is received from main storage and performs the function of indicating to the IOAU priority logic 116 in FIG. 4A that the data word to be stored in the PIP register 138 has been received by CAUA from main memory and will be supplied from CAUA to the logic contained within block 138 of FIG. 4A.

The flip-flops 103 and 105 of FIG. 4 are cleared by appropriate timing within block 100 after PIP register 138 is loaded in accordance with the data contained in said flip-flops 103 and 105. The flip-flop 107 is cleared after loading of PIP register 138 by means of an output signal from AND gate 134 of FIG. 4A, which in turn is energized by the resetting of flip-flop 119 in a manner to be described in more detail below.

Referring now more specifically to the logic within block 138, the IOAU function priority logic 116 functions to clear or set flip-flop 119 and thereby indicate whether the instruction to be loaded into the PIP register is coming from CAUA 136 or CAUB 137.

If such instruction is coming from CAUA 136, for example, flip-flop 119 is cleared to provide high level outputs (binary 1) to AND gates 120 and 128 and 134.

At this point it should be observed that the two flip-flops 126 and 133, which form the two-bit PIP register, are energized through two separate chains of logic within the block 138. More specifically, the flip-flop 126 is either cleared or set through a chain of logic including AND gates 120 and 121, OR gate 122, inverter 123 and the pair of AND gates 124 and 125.

On the other hand flip-flop 133 is either set or cleared through a chain of logic including AND gates 128 and 127, OR gate 129, inverter 130 and the pair of AND gates 131 and 132.

The four AND gates 120, 121, 128 and 127 form a matrix with AND gates 121 and 127 having inputs connected to outputs of flip-flops 103 and 105 of CAUA 136, and AND gates 120 and 128 having inputs connected to the outputs of flip-flops 111 and 113 of CAUB 137. The clear output of flip-flop 119 is connected to the other inputs of AND gates 120 and 128 and the set output of flip-flops 119 is connected to the other inputs of AND gates 121 and 127.

Thus, when CAUA 136 is supplying an instruction to the PIP register, the flip-flop 119 is in a set condition such that a binary 1 is supplied to AND gates 121 and 127, hich also receive the outputs of flip-flops 103 and 105, respectively, of CAUA 136.

Depending on what specific PIP instruction the flip-flops 103 and 105 contain, signals will be supplied up through the two logic chains described above to the flip-flops 126 and 133 of the PIP register. More specifically, when the PIP instruction is a $00_2$ then neither AND gates 121 and 127 is enabled. Further, it is to be noted that neither of AND gates 120 and 128 can be enabled since the clear output of flip-flop 119 is a binary 0. Accordingly, the outputs of both OR gates 122 and 129 must be 0's. Thus, neither AND gate 125 or AND gate 132 is enabled.

However, both AND gate 124 and AND gate 131 will have a binary 1 presented thereto from the inverters 123 and 130. Consequently, upon the occurrence of a timing signal from the IOAU timing logic 140, the AND gates 124 and 131 will be enabled. Said timing signal is supplied via lead 125 to all four of the AND gates 124, 125, 131 and 132. Thus, the two flip-flops 126 and 133 will both be caused to assume a clear condition, which represents a binary $00_2$.

Referring again to the operation of AND gate 134, it can be seen that said AND gate 134 is enabled when flip-flop 119 is cleared, to thereby produce an output signal which will clear flip-flop 107 in CAUA 136. The clearing of flip-flop 107 will condition the system to process the next executive instruction which calls for an alteration by CAUA 136 of the contents of PIP register 139 of FIG. 4A.

The operation of CAUB 137, when it is instructed by the executive program to change the PIP register, is identical to that of CAUA 136, using some duplicate logic. For example, AND gates 120 and 128 within block 138 are responsive to the condition of CAUB 137 rather than AND gates 121 and 127, which are responsive to the condition of CAUA 136. Also, AND gate 135, within block 138, is energized when flip-flop 119 is set to indicate to CAUB 137 that the loading of PIP register 139 by a PIP instruction from CAUB 137 has been completed.

IV. DESCRIPTION OF LOGIC FOR IMPLEMENTING THE ROUTING OF INTERRUPT SIGNALS IN ACCORDANCE WITH INSTRUCTIONS CONTAINED IN THE PIP REGISTER (FIGS. 5 AND 5A)

Referring now to FIGS. 5 and 5A there is shown the detailed logic for implementing an interrupt request signal in accordance with the specific PIP instruction contained in the PIP register. More specifically, the logic of FIG. 5 is constructed to implement the steps represented by the blocks 16 through 38 of the flow diagram of FIGS. 1 and 1A.

There are certain elements in the logic of FIGS. 5 and 5A which correspond to the more general block diagram of the system shown in FIG. 3. The corresponding elements are indicated below.

| FIG. 5 | FIGS. 3 and 3A |
|---|---|

| | |
|---|---|
| Block 58' | Block 46' |
| Toggle flip-flop 179 | Block 63 |
| Block 178 | Block 57 |
| Block 171 | Block 59 |
| Block 56' | Block 56 |
| Remember flip-flop 190 | Block 62 |

In FIG. 5 the logic within the block 58' represents four alternate paths under control of the instruction contained in the PIP register 56' for routing interrupt requests received from a peripheral device 189 on one of the 24 peripheral channel interfaces 171.

More specifically, the four AND gates 163, 164, 165 and 166 will become enabled, respectively, in response to PIP instructions $11_2$, $10_2$, $01_2$ and $00_2$ contained in PIP register 56', which consists of the two flip-flops 160 and 161. It is to be noted that the two flip-flops 160 and 161 correspond respectively to flip-flops 126 and 133 of FIG. 4A.

Viewing the logic of FIG. 5A generally, if the received interrupt request is to be routed to CAUA then the logic within block 58' functions to produce an output from OR gate 177 which will ultimately, through IOAU priority logic 195, IOAU timing and sequence logic 178 and the AND gate 180, set flip-flops 182 and 183. The flip-flop 182 then will send an interrupt request to CAUA, as discussed hereinbefore in connection with FIG. 3. The flip-flop 183 is the HIDA lockout flip-flop which prevents further interrupt request signals being supplied to CAUA until CAUA is ready to receive them. When ready to receive another interrupt request signal CAUA will clear the HID flip-flop 183 via one of the leads 187.

If the interrupt request signal is to be routed to CAUB then the logic within block 58' will produce an output from OR gate 174 which subsequently, through IOAU priority logic 195, IOAU timing and sequencing logic 178 and AND gate 181, will set the flip-flops 184 and 185. Setting of flip-flop 184 functions to send an interrupt request signal to CAUB. The flip-flop 185 is the HIDB lockout flip-flop which prevents further interrupt requests being sent to CAUB until advised otherwise by CAUB.

If the PIP register 56' contains a $00_2$ the interrupt request from peripheral device 189 will be routed to OR gate 177 until the instruction in the PIP register is changed. Similarly if the PIP register contains a $01_2$ all interrupt requests will be routed to the CAUB OR gate 174.

If the PIP register 56' contains a $10_2$ then the toggle flip-flop 179 becomes effective to alternate the routing of successive interrupt requests between CAUA and CAUB in a manner which will be described below.

If the PIP register 56' contains a $11_2$ then the routing logic within block 58' is under control of the member flip-flop 190 which will route each incoming interrupt request signal through either the OR gate 174 to CAUA or through the OR gate 177 to CAUA, depending upon which CAU originated the activity resulting in the interrupt request signal received.

In order to more fully understand the function of the logic in FIGS. 5 and 5A specific examples of operation will be discussed for each of the four possible PIP instructions $00_2$, $01_2$, $10_2$ and $11_2$.

When the PIP register 56' contains a $00_2$ the AND gate 166 will be enabled to provide a signal to OR gate 170 and then to one of the input leads of AND gate 173.

It is assumed that the HIDA lockout flip-flop 183 for CAUA is cleared so that a binary 1 is supplied to input lead 201 of AND gate 173. Thus, when the interrupt request signal occurs from peripheral device 189 the input lead 202 to AND gate 173 is also energized so that AND gate 173 is enabled to supply a binary 1 to OR gate 177. Such binary 1 passes through OR gate 177 and is supplied to the IOAU priority logic 195 and also to one input of AND gate 180.

Shortly thereafter the IOAU timing and sequence logic 178 will function to provide a signal on the other input lead 183 of AND gate 180 to enable said AND gate 180. The enabling of AND gate 180 will function to set both flip-flops 182 and 183.

The enabling of AND gate 180 also functions to clear toggle flip-flop 179. However, with the instruction $00_2$ in the PIP register 56' the condition of the toggle flip-flop 179 has no effect upon the routing of the interrupt request signal. The flip-flop toggle 179 only affects the output from AND gate 164 when the PIP register contains a $10_2$, as will be discussed below.

If the PIP register 56' should contain a $10_2$ then the AND gate 164 is energized which in turn supplies a binary 1 to an input of each of the AND gates 167 and 168. The other inputs of AND gates 167 and 168 are connected respectively to the true and false outputs of the toggle flip-flop 179. Thus only one of the AND gates 167 and 168 can be enabled at any given time. Assume, as an example, that toggle flip-flop 179 is in its cleared condition so that the AND gate 168 is enabled, thereby producing an output signal through OR gate 169 and to one of the inputs of AND gate 172. Assume further that the HIDB lockout flip-flop 185 for CAUB is cleared to cause the second input 204 of AND gate 172 to be at its high level. Thus, an interrupt request signal from a peripheral device 189 will be passed through AND gate 172, or gate 174 and subsequently to CAUB via a path including IOAU priority logic 195, IOAU timing and sequence logic 178, AND gate 181, and flip-flops 184 and 185.

Enabling of AND gate 181 will set toggle flip-flop 179, thereby changing it from its cleared condition to its set condition. Accordingly, the next interrupt request received will be routed through AND gate 167, which has one of its inputs connected to the true output of toggle flip-flop 179. The output of AND gate 167 will be routed through OR gate 170 to AND gate 173, and then through OR gate 177 to CAUA.

If the PIP register 56' contains a $11_2$, then AND gate 163 is energized to supply the high level signal to inputs 208 and 209 of AND gates 175 and 176, respectively. Accordingly, when an interrupt request signal is received from a peripheral device 189 it will be routed to AND gate 175 or AND gate 176 depending upon the condition of the remember flip-flop 190. As will be recalled there is a remember flip-flop for each peripheral input/output channel of the IOAU.

If the interrupt request is routed to AND gate 175 it will subsequently be routed through OR gate 174, and AND gate 181 to set the flip-flops 184 and 185 which are associated with CAUB. On the other hand, if the interrupt request is channeled through AND gate 176, it will subsequently pass through OR gate 177, and gate 180 to set flip-flops 182 and 183 which are associated with CAUA.

It is to be understood that AND gates 175 and 176 also depend upon the proper setting of the lockout flip-flops 183 and 185, respectively, in order to be in condition to be enabled. More specifically, HIDA flip-flop 183, associated with CAUA, must be cleared in order for AND gate 176 to be enabled. Similarly, HIDB flip-flop 185 must be cleared in order for AND gate 175 to be enabled.

It is to be understood that the form of the invention herein shown and described is but a preferred embodiment thereof and that various changes may be made in the logic arrangement without departing from the spirit or scope thereof.

What is claimed is:

1. In a multiprocessing system comprising a memory storing programs of instructions including an executive program, a first command arithmetic unit (CAUA) and a second command arithmetic unit (CAUB), an input/output access unit (IOAU), means for routing interrupt request signals from said IOAU selectively to either of said CAU's or to said two CAU's alternately, and comprising:

processor interrupt pointer (PIP) register means coupled to said memory for receiving and storing an instruction defining which of a plurality of possible routes to a CAU the next incoming interrupt request signal is to take;

first control means coupled to said memory and adapted to receive an instruction from said executive program stored in said memory for loading said PIP register with an instruction; and second control means responsive to the instruction stored in said PIP register to route the next executed interrupt request signal to a selected one of said first and second CAU's.

2. In a multiprocessor system employing interrupt request signals and comprising a first command arithmetic unit (CAUA), a second command arithmetic unit (CAUB), an input/output access unit (IOAU), and decision means for producing instructions for determining to which CAU each received interrupt request signal is to be routed, a method for routing said interrupt request signals to the CAU determined by the instructions produced by said decision means and comprising the steps of:

generating a first, second, third or fourth instruction for routing a received interrupt request signal respectively to the CAU which originated the activity resulting in the generation of the received interrupt request signal, to CAUA and CAUB alternately, to CAUA or to CAUB;

loading the generated instruction into a storage register;

decoding the loaded instruction;

establishing a route to CAUA or CAUB for the next received interrupt request signal in accordance with the instruction loaded in said storage register;

routing said next received interrupt request signal to CAUA or CAUB along the route established in accordance with the instruction stored in said storage register.

* * * * *